Dec. 9, 1969  B. S. BAKER  3,482,439
TENSILE TESTING APPARATUS
Filed Jan. 4, 1967  3 Sheets-Sheet 1

Inventor
BERNARD STUART BAKER
By Davis, Hoxie, Faithfull and Hapgood
His Attorneys

United States Patent Office 3,482,439
Patented Dec. 9, 1969

3,482,439
TENSILE TESTING APPARATUS
Bernard Stuart Baker, Coventry, England, assignor to Courtaulds Limited, London, England, a British company
Filed Jan. 4, 1967, Ser. No. 607,271
Claims priority, application Great Britain, Jan. 14, 1966, 1,823/66
Int. Cl. G01n 3/28
U.S. Cl. 73—95.5    9 Claims

ABSTRACT OF THE DISCLOSURE

An apparatus in which a specimen is clamped between two pairs of clamps, the inner pair defining the gauge length and a pair clamping the specimen outside the inner pair, the specimen path between the clamps being increased during testing at a grater rate between the outer clamps than between the inner clamps and at a greater rate between the inner clamps than between the adjacent inner and outer clamp.

---

Figure 1:
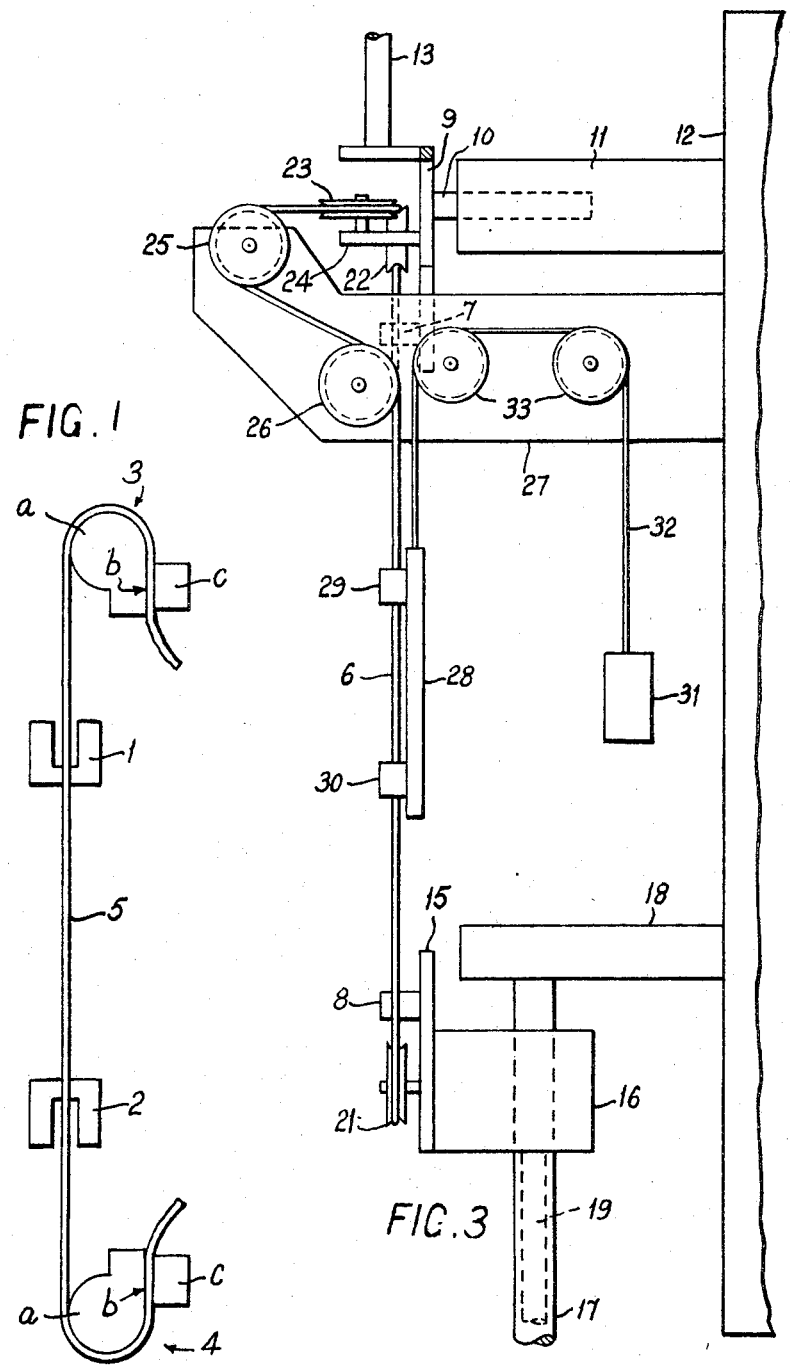

This invention relates to tensile testing apparatus and is concerned with apparatus for testing the tensile properties of specimens nominally of uniform cross-section, such as strips of material, rods, wires and textile yarns, cords and filaments. Usually in testing such specimens the clamps by which each specimen is held in the apparatus, and through which the load is applied, also define the gauge length. Frequently, in conducting such tests, the pressure of the clamps on the specimen causes additional strain in the regions of the clamps and the specimen breaks in one of these regions, giving a false result.

According to this invention a tensile testing apparatus comprises two pairs of clamps, an inner pair for clamping a specimen so as to define a guage length of the specimen between them, and an outer pair for clamping the specimen outside the inner pair, and means for increasing the lentgh of the specimen path such that the length of the path between the clamps of the outer pair is increased at a rate greater than that between the clamps of the inner pair but such that the rate of increase of the path length between the inner clamps is greater than that between the adjacent inner and outer clamps.

By the "specimen path" is meant the path occupied by the specimen when mounted in the aparatus ready for testing. It may, for example, be a straight line between the clamps, or may pass around guides which define the path.

The means for increasing the lentgh of the specimen path may include one or both of the clamps of one or both pairs of clamps, which are movable in relation to the other clamps. Where the specimen is flexible, the means may take the form of a guide or guides which, either alone or together with a movable clamp or clamps, are movable to increase the length of the path of the specimen.

Using an apparatus embodying the invention it is arranged that the part of the specimen between the inner pair of clamps is strained more than the parts between the adjacent inner and outer clamps and, by suitable choice of the gauge length of the specimen, in relation to the length of the specimen gripped between the outer clamps, it can also be arranged that the difference between the tensions in the specimen on each side of the clamps of the inner pair in very small. Only light clamping pressure is then necessary at the inner clamps and the likelihood of breakage due to distortion of the specimen at the clamps is thereby descreased.

As the maximum strain in the specimen is in the gauge length between the inner pair of clamps and there is no appreciable concentration of strain on the specimen at these clamps, breakage of the specimen normally occurs in the gauge length. It will be appreciated that the tension applied to the gauge length of the specimen is the total of the tensile forces applied by the two pairs of clamps.

The clamps may be arranged to hold the specimen in a substantially straight line between the clamps. Alternatively, for testing a flexible specimen, the parts of the specimen between adjacent inner and outer clamps (reckoned along the specimen) may pass around guides such as rods or pulleys between the clamps. An alternative arrangement of the clamps, for testing a flexible specimen, is one in which the specimen path is a substantially closed figure, for example substantially in the shape of a rectangle, four pulleys being positioned at the corners of the rectangule, the inner pair of clamps being spaced apart on one side of the rectangle and the outer pair of clamps being connected together on the side opposite to the inner pair. With this arrangement, by moving apart the inner clamps and by moving the two pulleys between one pair or adjacent inner and outer clamps away from the other two pulleys the whole length of the specimen is elongated. Provided that the length of specimen between the inner clamps is less than that of the remaining parts of the specimen between the outer clamps, the strain in the part of the specimen between the inner clamps will be greater than that in the parts of the specimen between the adjacent inner and outer clamps. This arrangement of the specimen path is simpler in practice than that with a substantially straight path in which the movements of at least three of the clamps need to be controlled.

In a preferred embodiment of the invention a substantially constant difference between the tensions in the parts of the specimen on each side of each of the clamps of the inner pair is maintained, irrespective of the tensile properties of the specimen. This is accomplished, during each test, by measuring the tensions in the parts of the specimen between the inner and outer pairs of clamps, and automatically adjusting the lengths of the said parts of the specimen, whilst extending the length of the specimen as a whole, so as to tend to maintain the tensions in those parts at values which are, at any time during the test, less than the tension in the gauge length of the specimen by a predetermined amount. The tension in the gauge length is, of course, measured continuously for the purpose of giving the test result.

In apparatus in which the outer pairs of clamps are rigidly connected together, as described above, the tensions in the parts of the specimen between the adjacent inner and outer clamps are substantially equal, assuming negligible friction losses. It is then necessary to measure the tension at one point only and also to adjust the length of the path between only one inner and the adjacent outer clamp so as to be able to maintain the substantially constant difference between the tensions in the parts of the specimen on each side of each of the inner clamps.

If the friction losses in the apparatus are significant, or if the specimen's properties vary appreciably along its length, it may still be desirable to measure the tensions in both parts of the specimen between the inner and outer clamps and to adjust the lengths of both parts accordingly.

Figure 2:
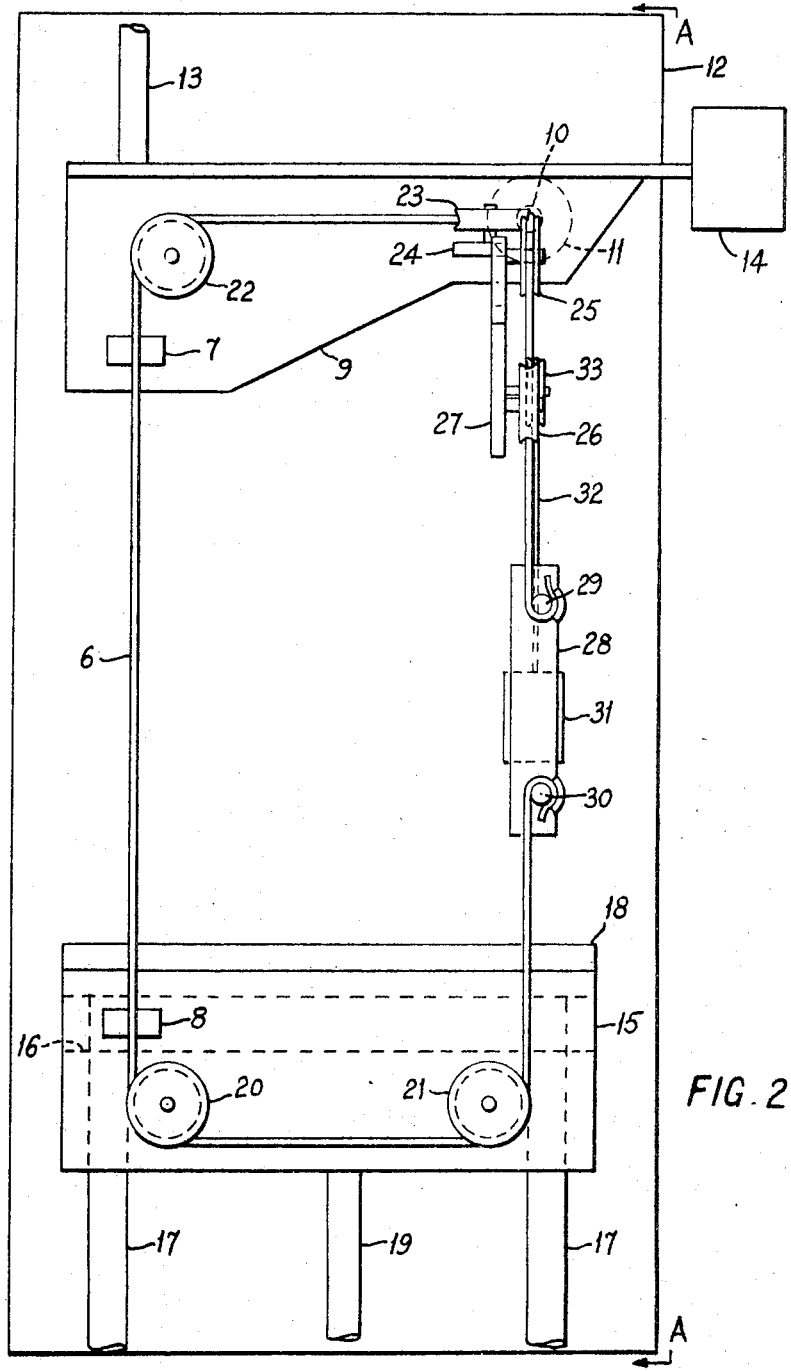
Figure 4:
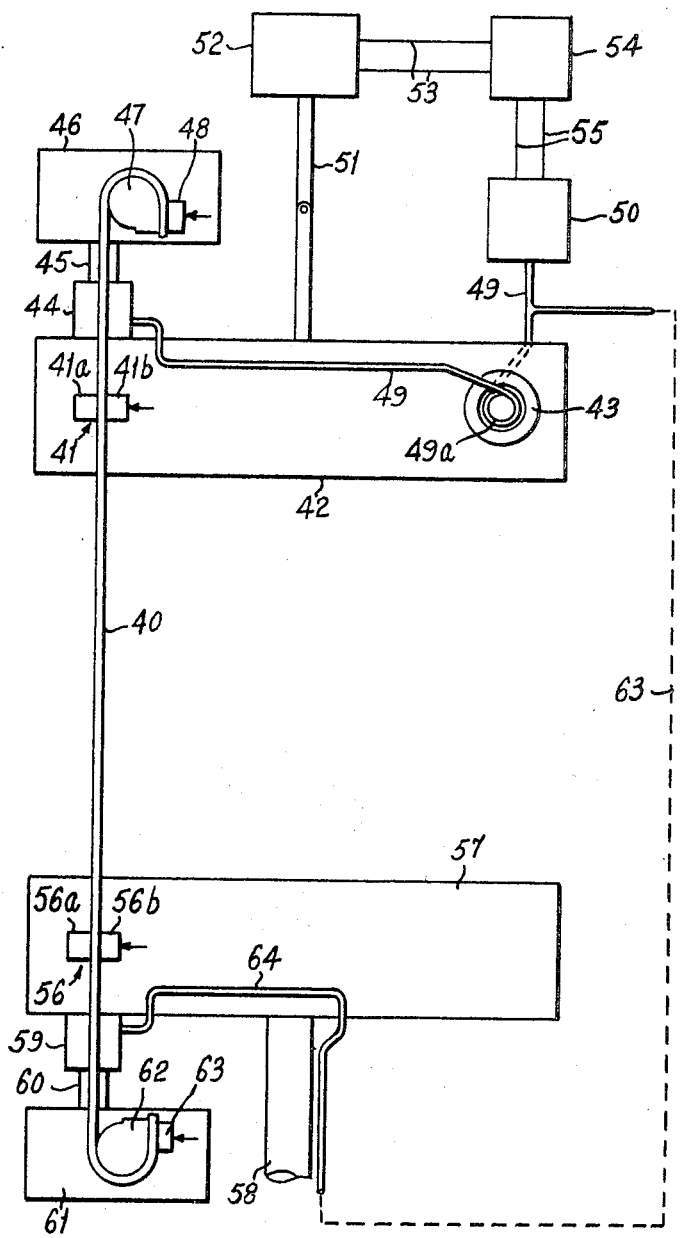

Embodiments of the invention are illustrated by way of example, by the accompanying drawings in which:

FIGURE 1 is a diagrammatic elevation of a first clamp arrangement of a tensile testing apparatus according to the invention in which the yarn path between the clamps is a substantially straight line, FIGURE 2 is a front elevation of a part of a yarn testing apparatus in which the yarn path is generally rectangular, FIGURE 3 is a side elevation taken on the line A—A of FIGURE 2, and FIGURE 4 is a front elevation of a further yarn testing apparatus in which the yarn path is straight.

In FIGURE 1 the clamp arrangement comprises a pair of inner clamps 1, 2, each of which comprises a pair of simple gripping jaws, and a pair of outer clamps 3, 4. Each outer clamp is of a known kind used in yarn testing apparatus comprising a bollard $a$ having a tangential surface $b$ extending from it and a plane jaw $c$ to grip the yarn against the tangential surface. A specimen 5 of yarn to be tested is placed between the inner clamps 1 and 2 and then, at each of the clamps 3 and 4 it is passed around the bollard $a$ through 180° and then over tangential surface $b$ against which it is clamped by the jaw $c$. The bollards $a$ provide for a gradual reduction in the tension in the yarn as it passes around the bollards, so that the risk of breakage of the specimen by the jaws $c$ is reduced.

In use the yarn is threaded through the various clamps as described and the clamps are then moved to draw the yarn just straight. The distance between the inner clamps 1 and 2 is then measured, for this is the gauge length. The two pairs of clamps are then moved apart at speeds which are dependent on the lengths of the yarn between the clamps, the rate of extension of the yarn outside the inner clamps being somewhat less than that between the inner clamps so that the greatest strain is applied to the latter part of the yarn. The total tension applied to the gauge length of the yarn is recorded by means not shown and the changes in the gauge length can be measured as the test proceeds.

In the apparatus shown in FIGURES 2 and 3, a part of a yarn specimen 6 to be tested is clamped vertically between two inner clamps 7 and 8 which define the gauge length of the yarn and each of which comprises a pair of simple gripping jaws. The remainder of the yarn specimen is passed in a generally rectangular path around pulleys in the apparatus as will be described. The clamp 7 is mounted on a pivoted arm 9 taking the form of a vertical plate with a horizontal flange projecting from its upper edge. The arm 9 is rigidly connected to a horizontal pivot spindle 10 which is rotatable in a bearing member 11 connected to the apparatus frame 12. A rod 13, axially aligned with the gripping surfaces of the clamps 7 and 8, projects vertically from the flange on the arm 9 and is connected at its upper end to a balance (not shown) for measuring the load on the yarn specimen under test. A counterweight 14 is mounted at the end of the arm 9 remote from the clamp 7.

The clamp 8 is mounted on a vertical plate 15 attached to a block 16 which is vertically slidable along two guides 17 which are rigidly attached to the apparatus frame 12 by a bracket 18. The movement of the block 16 is controlled by a rod 19 connecting the bock to a driving mechanism (not shown).

On the plate 15 two pulleys 20 and 21 are mounted on horizontal axes. Two further pulleys 22 and 23 are mounted on the arm 9 so as to be rotatable, respectively, about horizontal and vertical axes, the pulley 23 being mounted on a projection 24 from the arm 9. Two further pulleys 25 and 26 are mounted so as to be rotatable about horizontal axes on a vertical plate 27 projecting normally from the apparatus frame 12. All these pulleys together define the yarn specimen path.

Between the pulleys 21 and 26 is an elongated floating member 28 at the ends of which are mounted upper and lower clamping bollards 29 and 30, respectively for securing the ends of the yarn specimen 6. The pulleys 25 and 23 are so mounted that the yarn paths between them lie respectively on the axis of rotation of the arm 9 on the spindle 10 and at right angles through this axis, in order that the tension in the part of the yarn specimen between the clamp 7 and the bollard 29 does not cause any rotation of the plate, or reaction on the rod 13. Consequently, the force on the rod 13 is only the sum of the forces on the clamp 7 and the pulley 22, so that the balance to which the rod 13 is connected will give a direct reading of the tension in the gauge length. A counterweight 31 for the floating member 28 is connected to the floating member by a length of wire 32 passing over two pulleys 33 mounted on the plate 27.

In use the yarn specimen 6 is clamped between the clamps 7 and 8 and the end of the yarn projecting above the clamp 7 is passed successively about the pulleys 22, 23, 25 and 26 and is then firmly clamped to the bollard 29, and the end of the yarn beneath the clamp 8 is passed around the pulleys 20 and 21 before being clamped to the bollard 30.

Elongation of the specimen is accomplished by moving the plate 15 vertically downwards by movement of the rod 19 whilst the tension in the gauge length is measured on the balance connected by the rod 13 to the arm 9. During the test the whole of the length of the yarn specimen is stretched but since the sum of the lengths of the yarn between the clamp 7 and the bollard 29 and between the clamp 8 and the bollard 30 is longer than the gauge length of yarn, the tension in the gauge length of yarn is higher than that elsewhere. This results in yarn breakage somewhere in the gauge length, as is required. The tension in the yarn is recorded during the test, together with the extension of the yarn in relation to the original gauge length, by means not shown.

The apparatus shown in FIGURES 2 and 3 may readily be altered so as to maintain, during testing, a substantially constant difference between the tensions in the specimen on each side of each of the inner clamps. In one such modified apparatus (which is not shown in the drawing) the tension in the parts of the specimen between the adjacent inner and outer clamps is measured between the pulleys, 25 and 26. The measured tension is compared with the predetermined tension which there should be in those parts of the specimen, in relation to the tension in the gauge length, and the path length of the specimen between the pulley 20 and the bollard 30 is adjusted in the direction which tends to make them equal.

A suitable tension measuring device (also not shown) is a lever pivotally mounted on the plate 27 and bearing, at its upper end, a pulley contacting and thereby deflecting from a straight path the part of the specimen 6 between the pulleys 25 and 26. The lower end of the lever bears a contact to indicate, through the completion of an electrical circuit, when the lever reaches the extreme of its permitted movement in either direction, according to the tension in the yarn. A magnet having a force proportional to the current passing through the coil, is mounted on the apparatus frame 12 with one end of the coil contacting the lower part of the lever.

In operation, the tension in the specimen passing over the pulley causes the lower end of the lever to be urged towards the frame 12. This force is counteracted by passing a current through the magnetic coil so urging it away from the frame. During each test the magnitude of the current through the coil is increased as the tension in the gauge length of the specimen increases so that the two forces exerted on the lever are balanced whilst the tension in the parts of the specimen between the inner and outer pairs of clamps is less than the tension in the gauge length of the specimen by a predetermined amount. This is accomplished by generating a voltage proportional to the tension in the gauge length of the specimen and adding to this increasing voltage a constant voltage proportional to the desired tension difference across the inner clamps, and applying the total voltage across the coil circuit.

If the forces exerted on the lever become unbalanced, i.e. if the difference between the tensions on each side of each of the clamps of the inner pairs deviates far from the desired value, the movement of the lever causes the completion of an electrical circuit through the contact at its bottom end. The direction of movement of the lever determines whether the length of the path of the specimen between the pulley 20 and the bollard 30 should be increased or decreased to correct the imbalance. Obviously if the tension in the parts of the specimen outside the gauge length is too high the path length should be decreased to correct the tension and vice-versa.

A suitable device (which is not shown in the drawings) for adjusting the length of the path of the specimen between the pulley 20 and the bollard 30 comprises two parallel guiding rods fixed to the plate 15, and a boss movable along the guiding rods on rotation of a screw-threaded rod which is parallel to and between the guiding rods and which is threaded through the boss. A pulley is located on the boss and the specimen under test is passed from the pulley 20 around the pulley on the boss and then around the pulley 21, which may need to be repositioned on the plate 15, to the bollard 30. The rotation of the screw-threaded rod is controlled by a flexible drive so that the length of the path of the specimen can be increased or decreased according to the direction of rotation of the flexible drive, which is connected to a motor operated according to the signals produced on movement of the lever mentioned above.

In an alternative method of adjusting the lengths of the parts of the specimen between the inner and outer clamps of each pair, in the apparatus shown in FIGURES 2 and 3, the distance between the bollards 29 and 30 is altered by mounting one of the bollards on a screw-threaded member (not shown) attached to the elongated floating member 28 and rotating the screw-threaded member by a flexible drive, so as effectively to alter the length of the floating member during testing.

In the apparatus illustrated by FIGURE 4 a yarn specimen 40 is clamped between the jaws of an upper clamp 41, of which one jaw 41a is fixed and the other 41b is urged towards the jaws 41a by pneumatic pressure indicated by an arrow. The pneumatic cylinder assembly and piping are not shown. The clamp 41 is mounted towards one end of an arm 42 which is pivoted at its other end on a hollow pivot pin 43 to the apparatus frame (not shown).

A hydraulic cylinder 44 is mounted on the upper edge of the end of the arm 42 bearing the clamp 41. The piston rod 45 protruding from the cylinder 44 has on its free end a plate 46 bearing a bollard 47 around which the upper end of the yarn 40 is wrapped. The end of the yarn is clamped to the bollard by a jaw 48 which is urged towards the bollard by pneumatic pressure indicated by an arrow. The pneumatic cylinder assembly and piping are not shown.

The hydraulic cylinder 44 is supplied with fluid along a pipe 49 which passes through the hollow pivot pin 43 to the arm 42 and is coiled at 49a concentrically with the pivot so as to avoid its having any effect on the movement of the arm. The other end of the pipe 49 is connected to a transducer 50, the functioning of which is explained below.

A linkage 51 connects the arm 42 to a load cell 52 which produces a signal on its output lines 53. The potential of the signal is proportional to the load transmitted to the load cell from the arm 42 by the rod 51, which itself is proportional to the tension in the yarn connected to the clamp 41. The lines 53 connect the load cell 52 to a bias circuit 54 in which a predetermined potential is subtracted from the signal arriving on the lines 53 to give a new signal which is then transmitted on the lines 55 to the transducer 50. The transducer produces in the pipe 49 a hydraulic pressure which is proportional to the potential of the signal on the lines 55.

The lower end of the yarn 40 is clamped in a clamp 56 having a fixed jaw 56a and a movable jaw 56b, which is urged by pneumatic pressure, indicated by an arrow, towards the fixed jaw. The pneumatic cylinder assembly and piping are not shown. The clamp 56 is mounted on a plate 57 which is movable vertically under the influence of a rod 58, which connects the plate to a driving mechanism (not shown), and is guided in its movement by guides (also not shown).

On the lower edge of the plate 57 a hydraulic cylinder 59 is mounted, with its piston rod 60 projecting vertically downwards. The free end of the rod 60 bears a plate 61 on which a bollard 62 is mounted. The yarn 40 is wrapped about the bollard and is clamped to the bollard by a jaw 63 which is urged towards the bollard by pneumatic pressure, indicated by an arrow, no parts of the pneumatic cylinder assembly and piping being shown. A pipe 64 indicated in part by a dotted line, supplies the hydraulic cylinder 59 with fluid from the transducer 50, part of the pipe being flexible so as not to interfere with the movement of the plate 57.

The part of the yarn between the clamps 41 and 56 forms the gauge length, and the parts beyond these clamps, secured to the bollards 47 and 62 are, in the terms of the invention, to be stressed to a lesser degree than the gauge length.

The construction of the load cell 52, the transducer 50 and the hydraulic cylinders 44 and 59 are such that if the voltage produced by the load cell in response to a certain tension in the gauge length of the yarn is applied to the transducer, forces equal to that tension will be applied to the plates 46 and 61. Thus, by applying to the transducer a signal having a voltage lower by a predetermined voltage, forces a predetermined amount lower than that tension will be applied to the clamps, and the tension applied to the portions of the yarns outside the gauge length will be lower than the tension in the gauge length by that predetermined amount. The actual amount is determined by the setting of the bias circuit 54 according to the characteristics of the yarn being tested.

It will be appreciated that although the piston rods 45 and 60 have been shown connected to the plates 46 and 61 respectively, and the cylinders 44 and 59 to the arm 42 and the plate 57 respectively, the position of the piston rods and the cylinders can be reversed without affecting the operation of the apparatus.

To use the apparatus a yarn specimen is clamped slackly at first but after clamping is completed the yarn is straightened to remove any crimps it may have by moving downwards the plate 57 until a small predetermined load is detected on the load cell 52. At the instant when that load, termed the "pretensioning" load, is applied to the yarn specimen, the gauge length of the yarn is measured. This may be done electrically according to the position of the plate 57.

In addition to the load cell being used to produce the signal having a potential proportional to a load on its output lines 53, it is used to indicate to recording or other apparatus the load on the yarn at any given time.

The tension drop across the clamps 41 and 56 is chosen to be as high as possible without damaging the yarn under test. Because this tension drop is known and remains constant during the subsequent elongation of the yarn, irrespective of the tension in the gauge length of the specimen, optimum clamping pressure at the clamps 41 and 56 can be used. This is the minimum pressure which is sufficient to prevent the yarn from slipping through the clamps. For any given tension drop across the clamps the clamping pressure can be found and it is arranged that the pneumatic pressure urging the jaws together is held at the optimum value. Spring-loaded jaws could of course be used but the pressure applied by such jaws is not so readily adjustable.

Testing continues by moving downwardly the plate 57 until the yarn breaks. During testing the tension in the gauge length of the yarn increases but, as mentioned above, the tension drop across the clamps 41 and 56 stays constant as the pressure in the hydraulic cylinders 44 and 59 is increased progressively.

At the instant when the yarn breaks the movement of the plate 57 is stopped and its position is noted (generally electrically) for subsequent calculation of the percentage extension of the yarn at breakage. The load on the load cell at yarn breakage is also noted for subsequent computation of the breaking load.

Where an electrical device is used for determining the position of the plate 57 (and thus the gauge length and the extension) signals from this device and from the load cell may be fed to a computer which can be arranged to calculate and print or display the results of tests in whatever form is required.

Because of the use, in accordance with this invention, of a predetermined tension drop across the clamps 41 and 56 and the consequent use of a minimum clamping pressure across the jaws of the clamps, the yarns tested are damaged only very slightly, if at all, by being clamped in the jaws. This means that the yarn normally breaks between the clamps instead of at the clamps as often happens in conventional apparatus.

Additionally, because of the low clamping force required for the clamps 41 and 56, the use of clamps having jaws with narrow clamping lands becomes possible. This has the advantage of defining the gauge length much more precisely than would be the case if normal clamps having wide clamping lands were used.

The use of a straight yarn path as shown in FIGURE 4 is advantageous as there is no strain or friction exerted on the yarn by its passing around pulleys or other guides between the clamps and the bollards. Generally it is necessary to use bollards for clamping the ends of the yarns as plain clamping jaws, as used in the clamps 41 and 56, cannot exert a high enough clamping pressure on the yarn without damaging it. By wrapping the yarn about the bollard the clamping pressure is decreased.

What I claim is:

1. In a tensile testing apparatus comprising a pair of inner clamps for clamping a specimen so as to define a gauge length of the specimen and a pair of outer clamps to apply a load to the specimen beyond the inner clamps, the improvement comprising
    (a) means for moving the inner clamps apart under positive control,
    (b) means for increasing the length of the specimen between the inner clamps and the outer clamps to maintain the tension between the inner clamps and the outer clamps below that between the inner clamps, and
    (c) means for controlling the difference in the tension in the specimen on each side of each of the inner clamps.

2. In a tensile testing apparatus comprising a pair of inner clams for clamping a specimen so as to define a gauge length of the specimen and a pair of outer clamps to apply a load to the specimen beyond the inner clamps, the improvement comprising.
    (a) means for moving both of the inner clamps apart under positive control,
    (b) means for increasing the length of the specimen between the inner clamps and the outer clamps to maintain the tension between the inner clamps and the outer clamps below that between the inner clamps, and
    (c) control means adapted to maintain, during each test, a predetermined difference between the tension in the specimen on each side of each of the inner clamps.

3. Apparatus according to claim 2 wherein said control means comprises
    a device adapted to compare the tensions in the parts of the specimen between the inner and outer clamps with the tension in the gauge length of the specimen between the inner clamps and
    a mechanism responsive to the comparison between said tensions adapted to control the relative movements apart of the inner and outer clamps.

4. Apparatus according to claim 2 further comprising separate piston-and-cylinder means for mounting each pair of inner and outer clamps, the inner clamp of each pair being mounted on one element of one of the piston-and-cylinder means and the outer clamp of the pair being mounted on the other element, and control means for suppliying fluid under pressure to the piston-and-cylinder means to effect control movement apart of the inner and outer clamps.

5. Apparatus according to claim 4 further comprising a device adapted to generate a signal characteristic of the tension in the part of the specimen between the inner clamps, and means responsive to the signal adapted to control the fluid pressure supplied to the piston-and-cylinder means for maintaining, during each test, a predetermined difference between the tensions in the specimen on each side of each of the inner clamps.

6. Tensile testing apparatus comprising an inner pair of clamps for clamping a specimen so as to define a gauge length of the specimen between them, an outer pair of clamps for clamping the specimen outside the inner pair,
    a separate support mounting each inner clamp, means for moving said supports and inner clamps apart under positive control,
    guides around which the specimen passes between the clamps, said guides and outer clamps being so arranged that the specimen is in the form of a substantially closed figure and the gauge length of the specimen is less than half the total of the specimen between the outer clamps.

7. Apparatus according to claim 6 wherein said closed figure is substantially rectangular.

8. Apparatus according to claim 7 wherein the clamps of the inner pair are spaced apart on one side of the retangle and the clamps of the outer pair are connected together on the side of the rectangle opposite the inner pair.

9. In a tensile testing apparatus comprising a pair of inner clamps for clamping a specimen so as to define a gauge length of the specimen and a pair of outer clamps to applyi a load to the specimen beyond the inner clamps, the improvement comprising
    (a) means for moving the inner clamps apart under positive control,
    (b) means for increasing the length of the specimen between the inner clamps and the outer clamps to maintain the tension between the inner clamps and the outer clamps below that between the inner clamps, and
    (c) means for controlling relative movement of the inner and outer clamps ot control the difference in tension in the specimen on each side of each of the inner claims.

References Cited

FOREIGN PATENTS 2,014,631 12/1965 Great Britain.

RICHARD C. QUEISSER, Primary Examiner

J. W. MYRACLE, Assistant Examiner